United States Patent
Olt

[15] 3,685,163
[45] Aug. 22, 1972

[54] METHOD OF PRODUCING FINE PARTICLE AMMONIUM PERCHLORATE

[72] Inventor: Robert L. Olt, La Vale, Md.
[73] Assignee: Hercules Incorporated, Wilmington, Del.
[22] Filed: March 16, 1971
[21] Appl. No.: 124,702

[52] U.S. Cl..............................................34/5, 23/85
[51] Int. Cl................................................F26b 5/06
[58] Field of Search ...........................34/5, 92; 23/85

[56] References Cited

UNITED STATES PATENTS

| | | | |
|---|---|---|---|
| 3,452,445 | 7/1969 | Higgins | 34/92 X |
| 3,297,455 | 1/1967 | Ogden | 34/5 X |
| 3,159,498 | 12/1964 | Davis | 106/308 Q |

Primary Examiner—Frederick L. Matteson
Assistant Examiner—W. C. Anderson
Attorney—Michael B. Keehan

[57] ABSTRACT

A process for preparing ultra-fine ammonium perchlorate particles is provided. In this process an aqueous solution of ammonium perchlorate is dispersed in an organic liquid to form a water-in-oil emulsion. The emulsion is frozen and freeze dried to produce the ultra-fine particles.

12 Claims, 3 Drawing Figures

FIG. I

ROBERT L. OLT
INVENTOR

METHOD OF PRODUCING FINE PARTICLE AMMONIUM PERCHLORATE

This invention relates to a process for the production of ultra-fine ammonium perchlorate particles. More particularly, this invention relates to a process for freeze drying an aqueous emulsion of ammonium perchlorate whereby very fine ammonium perchlorate particles can be produced.

Ultra-fine particles of ammonium perchlorate are required in some propellant formulations in order to obtain a high burning rate solid propellant for rockets. It is well known that increased burning rate and thrust in rocket motors can be obtained by increasing the surface area of the oxidizer employed in the propellant composition. Current methods of producing fine particles of ammonium perchlorate are grinding and ball milling of ammonium perchlorate and freeze drying of a frozen solution of ammonium perchlorate in water. This latter process is described in detail in U.S. Pat. No. 3,452,445.

Processes such as grinding and ball milling of ammonium perchlorate particles are considered potentially hazardous processes and have a principal disadvantage in that undesirable impurities are sometimes found in the fine ammonium perchlorate resulting from these processes. The freeze drying process of the prior art has limitations as to the particle sizes which are produced in accordance with that process.

Figure 1:
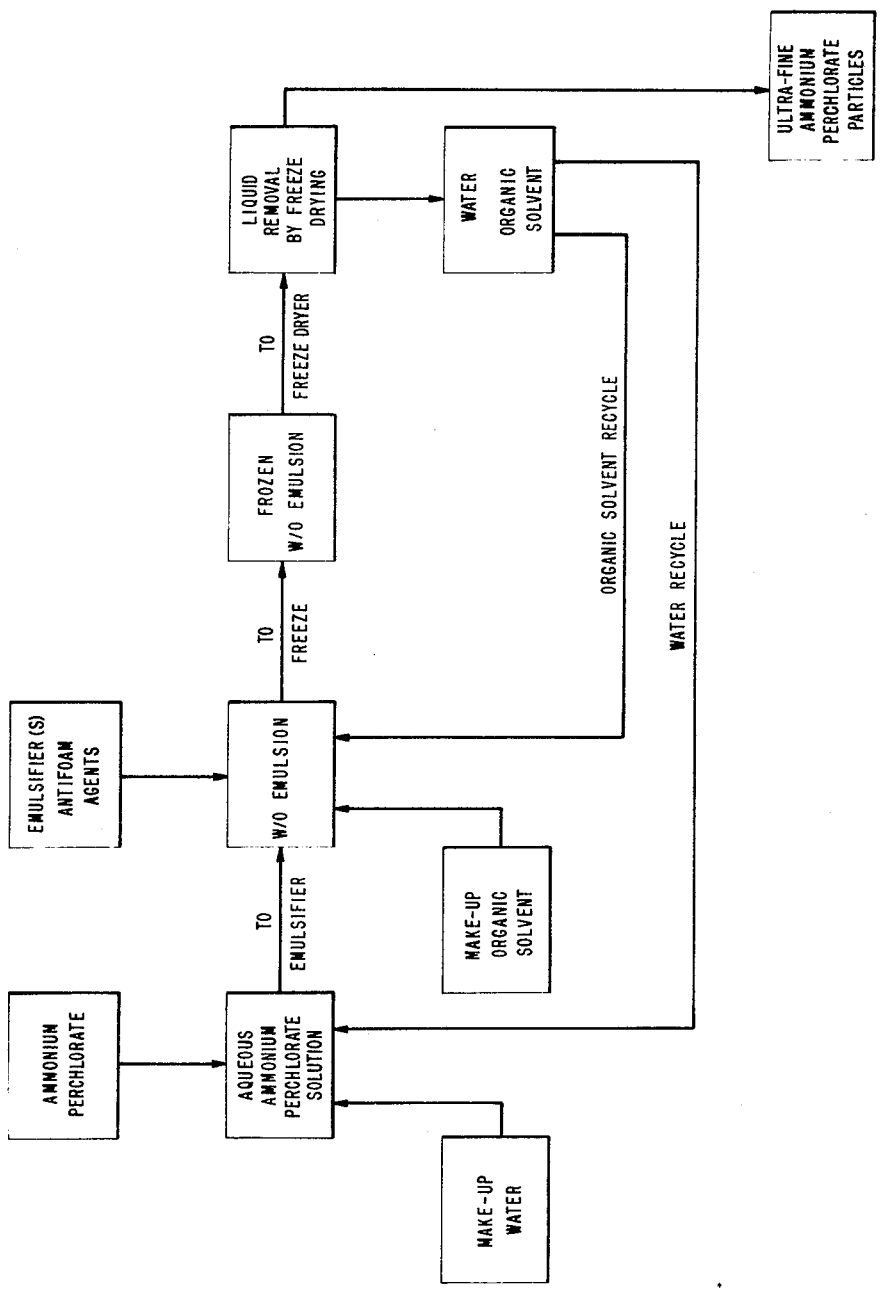
FIG. 1 is a process flow sheet illustrating the process of this invention.

In accordance with this invention a process for preparation of ultra-fine ammonium perchlorate particles is provided in which the weight median diameter of the ultra-fine ammonium perchlorate particles produced is less than about one micron. The process of this invention comprises, (a) dissolving ammonium perchlorate in water forming an aqueous solution of ammonium perchlorate, (b) admixing the aqueous solution of ammonium perchlorate and an organic liquid which is immiscible with water and which is a nonsolvent for ammonium perchlorate, (c) vigorously agitating said admixture forming an emulsion comprising a continuous phase comprising organic liquid and a dispersed phase comprising aqueous ammonium perchlorate solution, (d) freezing the emulsion, (e) subliming the organic liquid and the ice from the frozen emulsion, and (f) recovering fine ammonium perchlorate particles. A process flow sheet illustrating the process of this invention is shown in FIG. 1.

The ammonium perchlorate which is employed in preparing the aqueous solution of ammonium perchlorate can be of a commercial grade material. Higher grade ammonium perchlorate can be employed if desired. The ammonium perchlorate is dissolved in deionized water or other suitably purified water to avoid introducing impurities. The aqueous solution of ammonium perchlorate comprises by weight from about 85 percent to about 95 percent water and from about 15 percent to about 5 percent of ammonium perchlorate. If the weight percent of ammonium perchlorate in the aqueous solution is below about 5 percent, the process of this invention is not economical. If the weight percent of ammonium perchlorate in the aqueous solution of ammonium perchlorate exceeds about 15 percent by weight at room temperature the solution approaches saturation and growth of ammonium perchlorate crystals can begin. While slightly larger quantities of ammonium perchlorate can be dissolved in the solution at higher temperatures of say up to about 100° F., the difficulty in forming an emulsion of ammonium perchlorate in water at these higher temperatures is greatly increased.

Organic liquids which can be employed in forming the emulsion of this invention must be immiscible with water and must be substantially nonsolvents for ammonium perchlorate. Suitable organic liquids which can be employed in preparing the aqueous emulsion include straight and branched chain aliphatic hydrocarbons having from about 7–12 carbon atoms such as heptane, octane, isooctane, nonane, decane, undecane and mixtures thereof; aromatics such as benzene, toluene, ortho xylene, para xylene, meta xylene and mixtures thereof; aliphatic alcohols having from about 6–12 carbon atoms such as 1-hexanol, 1-octanol, 1-decanol and mixtures thereof and the like. The foregoing list of organic liquids is illustrative and not limiting in any way of organic liquids which are immiscible with water and which are substantially nonsolvents for ammonium perchlorate which can be employed in the process of this invention.

Figure 2:
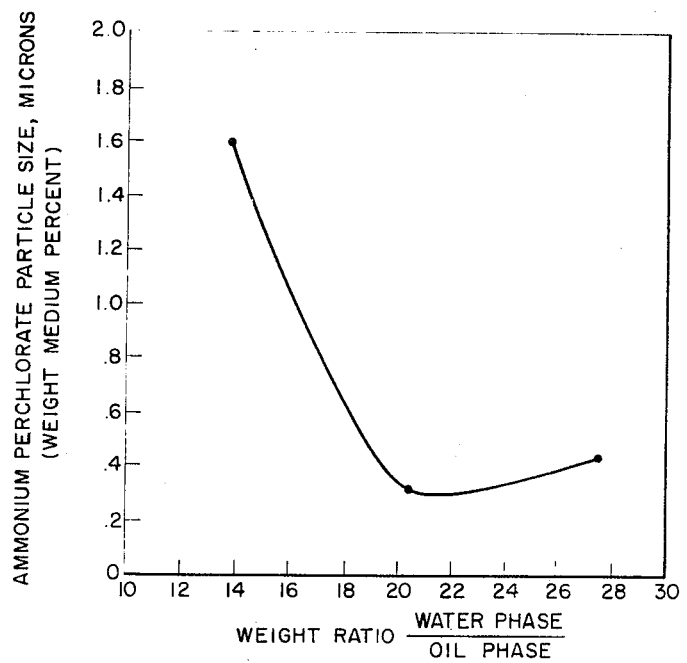
FIG. 2 illustrates the effect of the weight ratio on the size distribution of ammonium perchorate particles produced in accordance with the process of this invention.

The weight ratio of aqueous ammonium perchlorate solution, sometimes referred to as the water phase, to the organic liquid, sometimes referred to as the oil phase, in preparing an emulsion for use in the process of this invention is an important factor influencing the particle size of ammonium perchlorate which is produced. The effect of the weight ratio on the size distribution of ammonium perchlorate particles produced in accordance with the process of this invention is shown in FIG. 2. The weight ratio of the water phase to the oil phase to produce the ultra-fine ammonium perchlorate particles of this invention is from about 5/1 to about 21/1.

When preparing ultra-fine ammonium perchlorate particles, it is necessary that the emulsion which is freeze dried to produce the ultra-fine particles is stable. Thus, there should be no breakage in the emulsion during the freeze drying step of the process of this invention. The stability of the emulsion will depend, in part, on the organic liquid which is employed in preparing the emulsion. Organic liquids such as hexanol or octanol are immiscible with water, are substantially nonsolvents for ammonium perchlorate and also have emulsifying properties. Emulsions prepared employing aliphatic alcohols such as hexanol and octanol as the organic liquid are suitably stable for carrying out the process of this invention. When preparing an emulsion of aqueous ammonium perchlorate employing an organic liquid which does not have emulsifying properties, it is necessary to employ an emulsifying agent in combination with organic liquid in order to obtain stability of the emulsion produced.

Study has shown that the particle size of the ammonium perchlorate prepared in accordance with this invention is dependent on the droplet size of the dispersed phase. If the emulsion is not stable, the tiny droplets of dispersed aqueous ammonium perchlorate can coalesce before they can be frozen and the size of the ammonium perchlorate particles produced upon freeze drying is increased.

Emulsifying agents which can be employed in the process of this invention include any of the well known materials which are normally employed to reduce surface tension between water and an organic substance. Illustrative emulsifying agents which can be employed include surfactants of the anionic, nonionic and cationic type.

Examples of anionic surface-active agents include sodium alkyl sulfate; isopropylamine benzene sulfonate; sodium dodecyl benzene sulfonate; ammonium nonyl phenol polyglycol ether sulfate; sodium lauryl sulfate; ammonium lauryl sulfate; triethanol amine lauryl sulfate; unsaturated fatty acids of about 16 to about 20 carbon atoms in length such as oleic acid, and the like. Mixtures of two or more anionic surface-active agents can be used if desired.

Examples of nonionic surface-active agents include polyoxyethylene sorbitan monostearate; polyoxyethylene sorbitan monooleate; polyoxyethylene sorbitan monopalmitate; nonylpolyethylene glycol ether; polyethylene glycol monococanate; glycerol monococanate; glycerol monooleate; glycerol monostearate; nonyl phenoxy poly(ethyleneoxy) ethanol; aliphatic alcohols of about six to about 12 carbon atoms in length such as 1-hexanol, 1-octanol, 1-decanol; the amides of unsaturated fatty acids, such as oleamide; the amides of the prepolymers of carboxy terminated polybutadiene; and the like.

Examples of cationic surface-active agents include N-tallow trimethylene diamine dioleate; dehydroabietylamine-ethylene oxide adducts; lauryl dimethyl amine oxide; cetyl dimethyl amine oxide; primary fatty amine acetates; and the like.

Still other materials which can be employed as emulsifying agents in preparing ultra-fine particles of ammonium perchlorate in accordance with this invention include soaps, built detergents, and prepolymers for propellant binders such as prepolymers of carboxy terminated polybutadiene having a molecular weight range of from about 1,000 to about 20,000 and preferably from about 3,000 to about 10,000 and prepolymers of hydroxy terminated polybutadiene having a molecular weight range of about 2,500 to about 3,000. The foregoing prepolymers function as surfactants and can be used alone or in conjunction with another surfactant.

The amount of emulsifier needed will vary depending on the particular emulsifier chosen. Generally from 0.1 percent to about 1 percent of an emulsifying agent, based on the weight of the emulsion is sufficient. In preparing ultra-fine ammonium perchlorate by the process of this invention, the choice of emulsifying agent will effect the purity of the AP particles produced. Thus, where the emulsifying agent is readily sublimed during the freeze drying step of the process, the ammonium perchlorate particles produced will be very pure. Conversely, where the emulsifying agent in the aqueous solution of ammonium perchlorate is a material having a relatively high boiling point such as a prepolymer of carboxy terminated polybutadiene, the resulting small particle ammonium perchlorate will have a residual coating of the emulsifying agent deposited on or adhering to the tiny ammonium perchlorate particles produced. The only limitation on the emulsifying agent employed in the process of this invention is that if the ultra-fine ammonium perchlorate is to be employed in a propellant composition, any residue of emulsifier present on the ammonium perchlorate particles must be chemically compatible with the ingredients comprising the propellant composition being formulated.

The emulsions of this invention are prepared by vigorously agitating the ingredients for the emulsion, heretofore described, in a high shear mixer. Mixers of this type include by way of illustration, Waring Blenders and Manton-Gaulin Homogenizers.

The time required to produce an emulsion in high shear mixers is dependent upon the organic liquid employed, the emulsifying agent, and the weight ratio of water phase to oil phase. In general, emulsions of this invention can be prepared with high shear agitation in about 3 minutes or less.

Following preparation of the emulsion of aqueous ammonium perchlorate solution in an organic liquid (water-in-oil emulsion), the emulsion is frozen. Methods for freezing the emulsion include pouring or ladling the emulsion directly into liquid nitrogen ($-195°C.$) which is a rapid freezing technique, or freezing the emulsion on a freezing surface such as on a tray held at a temperature of at least $-40°$ C. This method is considered a moderate freezing rate technique with freezing time being on the order of 5 to 10 minutes depending on emulsion bed depth. Following the freezing of the emulsion, the frozen emulsion is dried.

The freezing step of the process of this invention is determinative, in part of the particle size of ammonium perchlorate that can be produced. Smaller ammonium perchlorate particle size is possible when the emulsion is frozen very rapidly, on the order of a few seconds after preparation of the emulsion. Stable emulsions can be frozen at a lower freezing rate with little effect on the resulting particle size of the ammonium perchlorate produced. A stable emulsion of aqueous ammonium perchlorate in organic liquid is defined herein as an emulsion in which the dispersed phase maintains its dispersed condition within the continuous phase during the time required to complete freeze drying.

Freeze drying of the emulsions of this invention has little or no influence on the ammonium perchlorate particle size produced, but it does affect the final product dryness and thus the storage behavior of the product. If the ammonium perchlorate particles produced in accordance with this invention are not sufficiently dried, the particles will agglomerate during storage. In the freeze drying step of this process, the freeze drier separates both the water and the organic liquid of the frozen emulsion from the ammonium perchlorate by a sublimation process. Ammonium perchlorate crystal growth is prevented while the emulsion remains in the frozen state.

Freeze drying involves both heat transfer and mass transfer operations. Optimum drying rates are achieved when all areas of the product are dried evenly and when the heat flux into the drying mass is sufficient to keep the drying surface temperature just slightly below the melting point of the water ammonium perchlorate crystal mixture. As the drying surface recedes, the heating temperature must be increased because the frozen material is in effect insulating itself with a coating of dried product. Such a heat flow control must be determined by actual experimentation. Drying rate is affected by heat and water vapor transport rate. Water vapor diffusion takes place through the dried portion of the material. After the vapor escapes from the bed of drying material, it moves by hydrodynamic flow to the condenser. Thus, increasing bed depth of the emulsion being dried significantly slows the drying rate due to increased resistance in both the heat and mass transport processes. Optimization of the drying process requires balancing tray loading with drying time to achieve maximum drier throughput.

It is generally preferred to operate the freeze drier at a reduced pressure of below about 175 $\mu$Hg. Actual reduced pressure conditions within the freeze dryer required to adequately dry the emulsions of this invention will vary depending on the organic liquid which is being sublimed during the freeze drying operation and the design of the freeze drier itself. The heat input to the freeze drier must be carefully programmed to obtain a maximum drying rate. If the rate of heat input to the drier is too high, back melting of the emulsion can occur which leads to larger AP solution droplets and hence larger AP particle size.

The following examples more fully illustrate the process of this invention. In these examples, parts and percentages are by weight unless otherwise specified.

EXAMPLES 1–5

An aqueous solution of ammonium perchlorate is prepared by dissolving 9.3 parts of ammonium perchlorate into 86.1 parts of water. To this solution is added 3.9 parts of benzene and 0.7 parts of an emulsifier which is an amide of oleic acid available commercially under the tradename Solar F–221 from Swift & Co. The resulting admixture is vigorously agitated in a Waring Blender for about one minute. After vigorous agitation the emulsion is ladled into liquid nitrogen at −195° C. and is completely and rapidly frozen. The frozen emulsion is removed from the liquid nitrogen container and placed in a freeze drier, which is a Repp Model FFD–15–WS Vacuum Sublimator. The freeze drier is operated at a reduced pressure of between about 75 $\mu$ and 550 $\mu$Hg during the drying cycle. The pressure measured at the end of the drying cycle is about 175 $\mu$Hg. At the end of the drying cycle ammonium perchlorate particles are recovered. The recovered ammonium perchlorate particles have a weight mean diameter of about 0.44 $\mu$.

Four additional emulsions are prepared following the procedure heretofore described. The compositions of the emulsion and the product produced in accordance with the freeze drying process of this invention is set forth in Table I below.

TABLE I

Emulsion Composition, Wt. %

| | Example | | | | |
|---|---|---|---|---|---|
| | 1 | 2 | 3 | 4 | 5 |
| Ammonium perchlorate | 9.3 | 9.3 | 8.5 | 8.5 | 9.2 |
| Water | 86.1 | 86.1 | 78.8 | 78.8 | 85.7 |
| Benzene | 3.9 | 3.9 | — | — | 3.2 |
| n-Heptane | — | — | 12.3 | 12.3 | 1.6 |
| Amide of oleic acid* | 0.7 | 0.7 | — | — | 0.2 |
| carboxy terminate polybutadiene prepolymer | — | — | 0.4 | 0.4 | 0.1 |
| Silicone Oil | — | Trace | — | Trace | Trace |

Product Composition, Wt. %

| | | | | | |
|---|---|---|---|---|---|
| Ammonium perchlorate | 93.0 | 92.7 | 95.7 | 95.1 | 97.1 |
| Amide of oleic acid* | 7.0 | 6.9 | — | — | 1.6 |
| Carboxy terminated polybutadiene prepolymer | — | — | 4.3 | 4.3 | 0.9 |
| Silicone Oil | — | 0.4 | — | 0.6 | 0.4 |
| Particle size microns** | 0.44 $\mu$ | 0.30 $\mu$ | 0.84 $\mu$ | 0.52 $\mu$ | 0.41 $\mu$ |

*Solar F-221
**Weight median diameter

Figure 3:
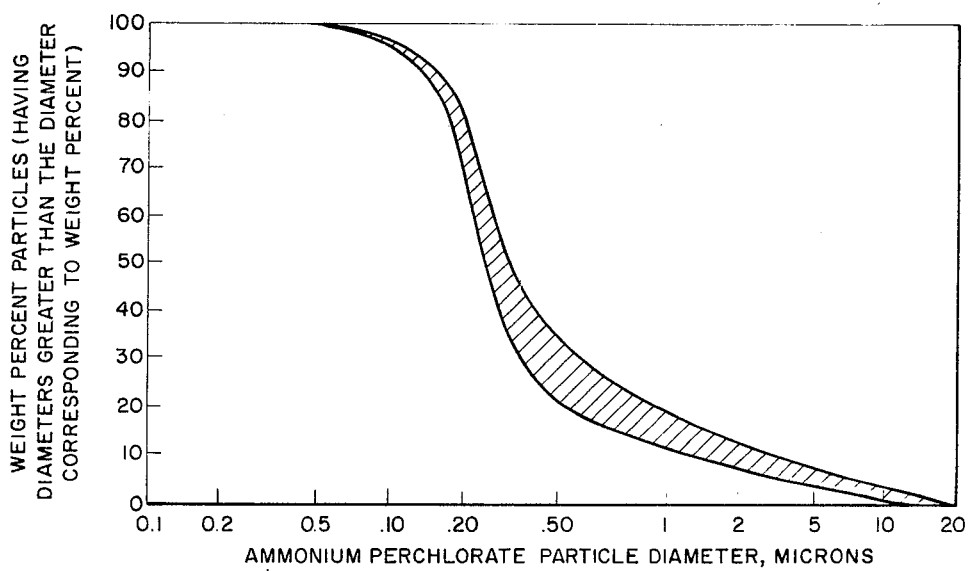
FIG. 3 shows particle size distribution.

The process of this invention is capable of producing ammonium perchlorate particles wherein from about 80–90 percent by weight of the particles produced have a diameter of less than 1 micron. The particle size distribution of ammonium perchlorate particles produced in accordance with the process of this invention is determined employing a Mine Safety Appliance Co. Particle Analyzer. Particle size distribution is illustrated in FIG. 3. This data corresponds to the results from 11 replicate runs employing 86.1 percent water, 3.9 percent benzene, 9.3 percent ammonium perchlorate, 0.7 percent oleamide and a trace of silicone oil. The particle size envelope illustrated corresponds to a weight median diameter of ammonium perchlorate particles of 0.284 $\mu$.

Additional additives can be introduced into the emulsions of this invention to produce further decreases in ammonium perchlorate particle size. Principal among these additives are antifoaming agents. Because of the slight solubility of most emulsifying agents in the aqueous phase of the emulsion, foam formation may occur during the early stages of emulsification. The presence of such foam causes preferential migration of the emulsifying agent to the gas liquid interface in the emulsion with an attendant decrease in emulsion stability and consequent increase in ammonium perchlorate particle size which is produced. Silicon compounds such as silicon modified oils are excellent defoaming agents due to their low surface tension, low solubility in water and excellent spreading characteristics. The presence of such defoaming agents when forming the emulsions employed in the process of this invention also improves the ease of emulsion formation and emulsion stability. In general, defoaming agents are employed in very small amounts and less than 1 percent by weight, based on the weight of the emulsion.

The process of this invention is a particularly suitable process for preparation of ultra-fine particle ammonium perchlorate because the high water content of the emulsions renders the emulsion nonexplosive. Furthermore, the low temperature involved in freeze drying provides a safe environment for the ammonium perchlorate.

What I claim and desire to protect by Letters Patent is:

1. A process for preparation of finely divided ammonium perchlorate particles comprising:
   a. dissolving ammonium perchlorate in water to form an aqueous solution of ammonium perchlorate,
   b. admixing the aqueous solution of ammonium perchlorate and an organic liquid which is immiscible with water and which is a nonsolvent for ammonium perchlorate,
   c. vigorously agitating said admixture forming an emulsion comprising a continuous phase comprising organic liquid and a dispersed phase comprising aqueous ammonium perchlorate solution,
   d. freezing the emulsion,
   e. subliming off the organic liquid and ice from the frozen emulsion, and
   f. recovering fine ammonium perchlorate particles.

2. The process of claim 1 wherein the aqueous solution of ammonium perchlorate comprises from about 85 percent to about 95 percent by weight of water, and from about 15 percent to about 5 percent by weight of ammonium perchlorate.

3. The process of claim 2 wherein the weight ratio of the aqueous ammonium perchlorate solution to the organic liquid is from about 5/1 to about 21/1.

4. The process of claim 3 in which the organic liquid employed is an aliphatic alcohol selected from 1-hexanol, 1-heptanol, 1-octanol, 1-nonanol, 1-decanol and mixtures thereof.

5. The process of claim 3 wherein an emulsifying agent is added to the admixture of step (b).

6. The process of claim 5 wherein a defoaming agent is added to the admixture of step (b).

7. A process for preparation of ammonium perchlorate particles wherein the weight median diameter of the particles produced by said process is less than about 1 micron, said process comprising:
   a. dissolving ammonium perchlorate in water forming an aqueous solution of ammonium perchlorate,
   b. admixing the aqueous solution of ammonium perchlorate, an organic liquid which is immiscible with water and which is a nonsolvent for ammonium perchlorate and an emulsifying agent,
   c. vigorously agitating said admixture forming an emulsion comprising a continuous phase comprising organic liquid and a dispersed phase comprising aqueous ammonium perchlorate solution,
   d. freezing the emulsion,
   e. subliming the organic liquid and ice from the emulsion at reduced pressure, and
   f. recovering fine particle ammonium perchlorate.

8. The process of claim 7 wherein the aqueous solution of ammonium perchlorate comprises from about 85 percent to about 95 percent by weight of water, and from about 15 percent to about 5 percent by weight of ammonium perchlorate.

9. The process of claim 8 wherein the admixture of step (b) contains a defoaming agent.

10. The process of claim 8 wherein the organic liquid is selected from benzene, toluene, meta-xylene, ortho-xylene, para-xylene and mixtures thereof.

11. The process of claim 8 wherein the organic liquid is heptane.

12. The process of claim 11 wherein the emulsifying agent comprises a mixture of the prepolymer of carboxy terminated polybutadiene and oleamide.

* * * * *